C. E. GIERDING.
TROLLEY BASE.
APPLICATION FILED SEPT. 6, 1911.
1,033,166.
Patented July 23, 1912.
2 SHEETS—SHEET 1.
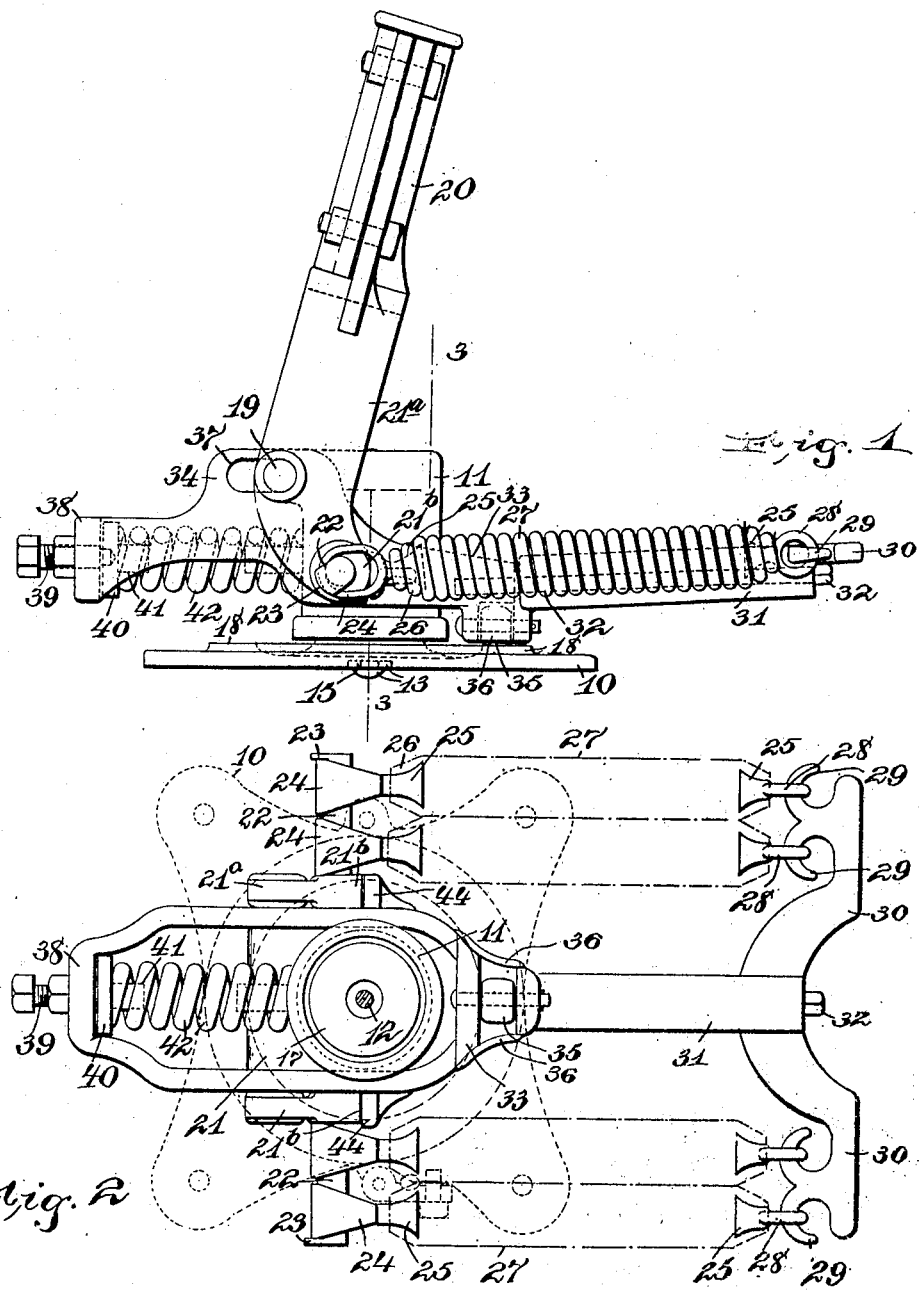

C. E. GIERDING.
TROLLEY BASE.
APPLICATION FILED SEPT. 6, 1911.
1,033,166.
Patented July 23, 1912.
2 SHEETS—SHEET 2.
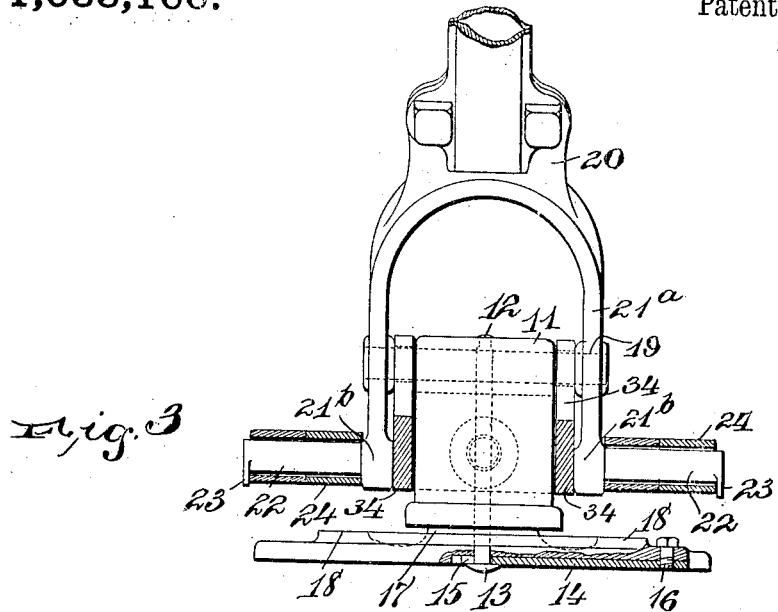
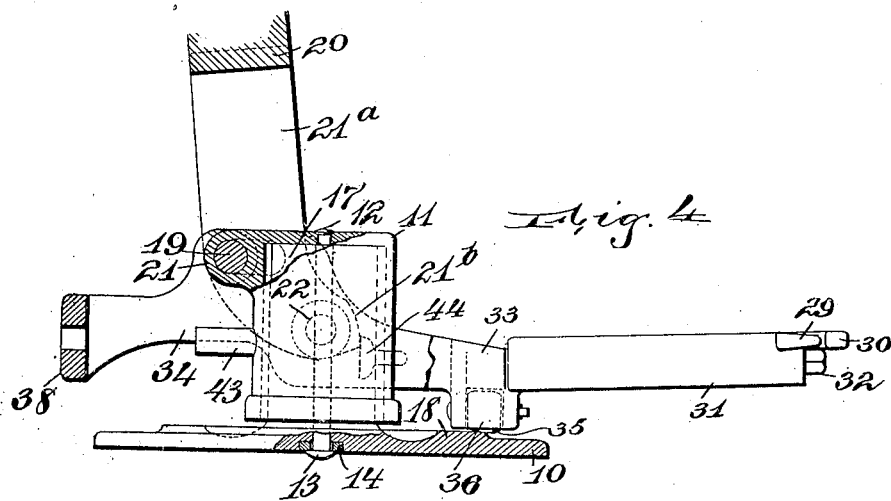
WITNESSES.
M. A. Johnson
Leslie G. Chandler
INVENTOR
Charles E. Gierding
BY
Wm. H. Caufield
ATTORNEYS

UNITED STATES PATENT OFFICE.

CHARLES E. GIERDING, OF NEWARK, NEW JERSEY.

TROLLEY-BASE.

1,033,166.  Specification of Letters Patent.  Patented July 23, 1912.

Application filed September 6, 1911. Serial No. 647,896.

*To all whom it may concern:*

Be it known that I, CHARLES E. GIERDING, a citizen of the United States, residing at Newark, in the county of Essex and State of New Jersey, have invented certain new and useful Improvements in Trolley-Bases; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a trolley base which is adapted to support a trolley arm so that when the trolley arm jumps, the consequent shock on the base is minimized through an equalization brought about by the mechanism of the base.

The improved trolley base is provided with a spring mechanism which tends to normally hold the trolley arm substantially upright or with its trolley-wheel against the wire, but if released from the wire, the trolley arm swings by reason of the pressure of this spring mechanism so as to violently swing the trolley arm upward.

The improved trolley base provides for an abutment against which the trolley arm is designed to swing; the abutment being constructed to yield and to minimize the shock of the contact of the trolley arm with the base and to prevent any breakage of parts or straining of the mechanism through too violent a contact. The trolley base also comprises a base of this type which is rotatable and which easily rotates both when the trolley arm is pulled down by its rope and the carriage then swung.

The invention is illustrated in the accompanying drawings; in which—

Figure 1 is a side view of the improved trolley base, and Fig. 2 is a bottom view thereof with the base-plate shown in dotted outline. Fig. 3 is a section on line 3, 3, in Fig. 1, and Fig. 4 is a side view of the trolley base stripped of its springs and being broken away to show the construction of the parts, this view also illustrating the position of the relieving mechanism when the trolley arm has engaged it and it is pushed to its limit of movement by the trolley arm.

The base consists of a base-plate 10 on which is mounted a turret or support 11 rotating on a bolt 12 which is provided with a head 13. A locking strip 14 is slid in a recess in the bottom of the base-plate 10 and is forked as at 15 to receive the bolt 12 as far as the head 13. A screw 16 locks the locking strip in place, and there is no opportunity for the bolt 12 to become loosened or accidentally withdrawn. The locking strip when withdrawn permits the bolt and the turret to be lifted sufficiently to give access to a part of the inside of the turret. The turret 11 swings on the stud 17 of the base and may be provided with any type of anti-friction device for taking up the wear. The base-plate 10 is provided with a circular track 18, the use of which will be described hereinafter.

At the front of the turret is mounted a pivot 19 on which swings a trolley arm 20, the trolley arm being preferably forked to embrace the bearing 21 and extend down on both sides of the turret and extend beyond the pivot, its projecting ends 21ª having rods 22 extending therefrom. The rods 22 are fitted with lips 23 at their ends, these lips preventing the sleeves 24 from slipping from the rods. The sleeves 24 are integral with anchors 25, which anchors are seated in the narrowed ends 26 of the springs 27, which springs, on the ends opposite the trolley arm, are provided with duplicates of the anchors 25, which are in turn provided with eyes 28. The eyes 28 fit over hooks 29 of the frame 30, which frame is preferably made T-shaped and fixed on the bar 31. A screw-bolt 32 passes through the bar 31 and fastens it to the tail 33 of the yoke 34. The tail of the yoke is provided with a roller 35 which runs on the track 18 and supports the base against excessive strain when the trolley arm is swung down and then turned. Lips 36 extend down nearly to the track 18 from the tail of the yoke and move snow and sleet from the track when necessary.

The yoke 34 fits along both sides of the turret 11 and has its side walls arranged between the turret and the two ends of the trolley arm. The walls of the yoke are slotted as at 37, these slots receiving the pivot 19 and sliding thereon, the slot limiting the sliding movement of the yoke. The yoke has a head 38 which has a regulating screw 39 therein, the screw in turn acting against a washer 40, which washer has a stud 41 to enter one end of a spring 42. The spring 42 thus abuts on the yoke at one end, and on the support or turret on the other end, the turret having a stud 43 to enter the spring and coöperate with the stud 41 to hold the spring 42 alined. The yoke is provided at the sides with abutments 44 which are in line with the projecting ends 21ª of the trolley arm, the ends 21ᵇ of the forked part of the trolley arm being adapted to be swung against the abutments. This is desirable when the trolley arm is suddenly released and the springs 27 exert all their force to elevate the trolley arm. The projecting ends of the trolley arm hit these abutments 44 and the yoke is pushed forward. The yoke, as soon as it moves, acts to compress the spring 42, and this spring thus acts as a bumper and yieldingly holds the yoke against violent motion, thus preventing breaking and straining of parts. When the trolley arm is pulled down to draw it away from the trolley-wire, or when it is in place with its wheel on the wire, the projecting ends of the trolley arm are out of contact with the abutments 44 and the yoke is pushed by the spring 42 to the forward position shown in Fig. 1. At the same time the springs 27 are under tension, this tension pulling the spring-holding arms or frame 30 to force the yoke forward. The roller 35 rests on the track 18 and assists in holding the base without strain. The track 18 is made wide enough to support the roller 35 when the yoke is either in its forward or rear position. When the trolley arm swings toward an upright position, its projecting ends 21ª have their extremities 21ᵇ engage the abutments 44, the yoke is started forward against the action of the spring 42 and the trolley arm is halted easily and without shock to the arm or the base. If the arm is free to rock and swing, it is soon held substantially steady by the opposed action of the springs 27 and 42, as will be seen from Fig. 1. The degree of opposition presented by the spring 42 to the trolley arm, and the pressure of the spring is adjusted by the screw 39.

Having thus described my invention, what I claim is:—

1. A trolley base comprising a support, a trolley arm hinged near its end to the support so as to form a projecting end, a spring mechanism for forcing the trolley arm upright, a yoke sliding on the support and acting to anchor the spring mechanism, the yoke having means for engaging the projecting end of the trolley arm when the arm escapes from the wire, and a spring normally resting on the support and on the yoke, said spring acting to force the yoke in opposition to the direction of force exerted by the trolley arm.

2. A trolley base comprising a support, a trolley arm hinged near its end to the support, a yoke sliding on the support, a spring mechanism for forcing the trolley arm upright, said spring mechanism being secured to the yoke and the trolley arm, means for limiting the sliding movement of the yoke, the yoke being adapted to be engaged by the trolley arm when the trolley arm is swung toward an upright position, and a spring normally bearing on the yoke and on the support for resisting the swing of the trolley arm toward an upright position.

3. A trolley base comprising a base-plate, a turret on the base-plate, a trolley arm swinging on the turret, a yoke sliding on the turret and projecting from its opposite ends, a spring mechanism connected to one end of the yoke and to the trolley arm and having a normal tendency to force the trolley arm toward an upright position, means on the yoke for engaging the trolley arm when the trolley arm swings toward an upright position, and a spring bearing on the turret and bearing on the yoke, said spring resisting the movement of the yoke induced by the engagement of the trolley arm with the yoke as the trolley arm swings toward an upright position.

4. A trolley base comprising a base-plate, a turret on the base-plate, a yoke with side walls flanking the turret, the yoke having a tail on one end and a head on the other end, a forked trolley arm pivoted to the sides of the turret, the yoke having slots to receive the pivot of the trolley arm and permit the sliding of the yoke, a spring mechanism connected to the trolley arm and the tail of the yoke, a spring between the head of the yoke and the turret, and abutments on the yoke against which the trolley arm is forced when it swings toward an upright position.

5. A trolley base comprising a base-plate, a turret on the base-plate, a yoke having side walls to flank the turret, the side walls terminating at one end in a head of the yoke and merging on the other side of the turret into a tail, a forked trolley arm pivoted to the turret having its forked ends extending down the sides of the turret, abutments on the side walls of the yoke adapted to be engaged by the forked ends of the trolley arm when it swings toward an upright position, spring mechanism connected to the tail and to the ends of the trolley arm for drawing the ends toward the abutment, and a spring mounted between the side walls and abutting on the head of the yoke and the turret, the side walls of the yoke having slots through which the pivot of the trolley arm extends, the slots permitting the sliding movement of the yoke.

In testimony that I claim the foregoing, I have hereunto set my hand this 2d day of September 1911.

CHARLES E. GIERDING.

Witnesses:
J. ROWLAND BROWN,
J. C. PAINTER.